Sept. 1, 1959

C. A. TOCE ET AL 2,902,532

ELECTRIC STORAGE BATTERY

Filed Oct. 19, 1955

INVENTORS
Charles A. Toce
Robert Broussard
BY

THEIR ATTORNEY

Sept. 1, 1959 C. A. TOCE ET AL 2,902,532
ELECTRIC STORAGE BATTERY
Filed Oct. 19, 1955 2 Sheets-Sheet 2

INVENTORS
Charles A. Toce
Robert Broussard
BY
THEIR ATTORNEY

United States Patent Office 2,902,532
Patented Sept. 1, 1959

2,902,532
ELECTRIC STORAGE BATTERY

Charles A. Toce, Sunland, and Robert Broussard, Glendale, Calif., assignors, by mesne assignments, to Electro-Acid Corporation, Carson City, Nev., a corporation of Nevada Application October 19, 1955, Serial No. 541,447

3 Claims. (Cl. 136—171)

Our invention relates to electric storage batteries and particularly to an improved form of battery characterized by having a plurality of individual interchangeable cells.

An object of our invention is to provide an electric storage battery which is of simple, rugged and comparatively inexpensive construction employing a plurality of individual cells having a container for the group of cells which resiliently locks the cells together in firm, reliable grip and yet which further employs that resiliency as the means by which the container quickly and surely releases its grip on the cells to achieve easy cell release and replacement.

Another object is to provide an interchangeable cell unit for an electric storage battery, which cell is economical to produce and which is both readily assembled and disassembled incident to manufacture of the battery and to servicing operations thereon.

A further object is to provide an electric storage battery employing a plurality of cooperating cells in which the several cells are so constructed and arranged as to provide ventilation and heat dissipation between adjacent cells and yet in which the individual cells are protected against deleterious effects of vibration all to the end of assuring maximum battery life.

Still another object of our invention is to provide an electric storage battery which for a given capacity is light in weight, strong and durable and which is less subject to damage from shock, impact and high atmospheric temperatures than batteries which are in general current use.

Other objects in part will be obvious and in part pointed out in the description which follows.

Accordingly, our invention resides in the features of construction, combination of elements and arrangement of parts, as described in the following specification of a presently preferred embodiment of our invention or shown in the accompanying drawings.

Figure 3:
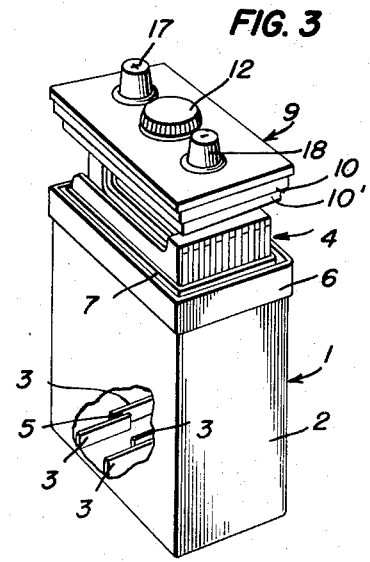
Fig. 3 is a partially exploded perspective view of one of the cells of the battery of Fig. 1.
Figure 4:
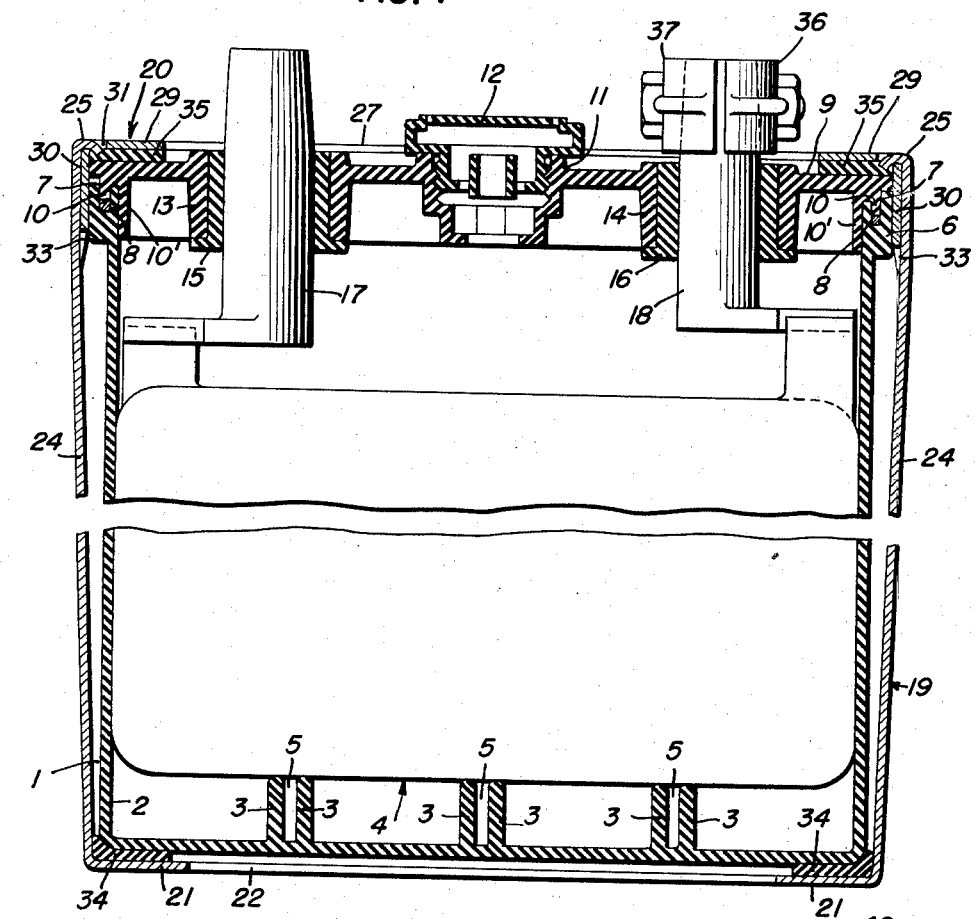
Fig. 4 is an enlarged transverse sectional view taken on the line 4—4 of Fig. 1.
Figure 5:
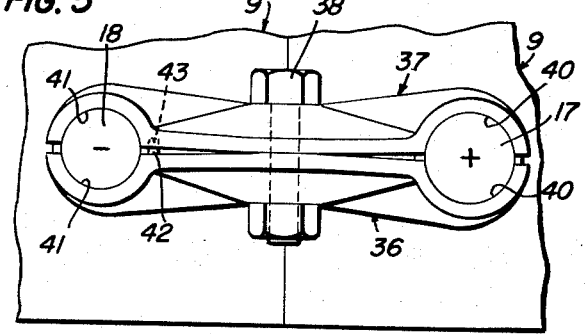
Fig. 5 is an enlarged plan view of one of the clamps employed to connect the terminals of adjacent cells as applied to the terminals of the battery of Fig. 1.
Figure 6:
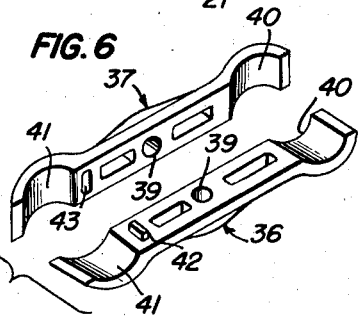
Fig. 6 is a perspective exploded view of the component parts of Fig. 5, the conventional bolt and nut used therewith being omitted in the interests of clarity.

Referring now to the practice of our invention, attention is first directed to Figs. 3 and 4. There is shown the construction of the individual cells of our battery. Each cell 1 comprises a generally rectangular case 2 formed of a plastic molded material, preferably polyethylene. And preferably the case is provided with a series of ribs 3 extending transversely across the bottom. These afford support for the plate and separator assembly 4 which may be of the conventional type employed in lead-acid storage batteries.

The ribs 3 are arranged in two groups, one group extending from one side of the case to a point slightly beyond the longitudinal center line of the case and the other group extending from the opposite side of the case slightly past the said center line and being slightly laterally offset from the said one group. With this construction there is achieved passages 5 between the ends of the ribs to assure a free circulation of the battery electrolyte beneath the plate and separator assembly and between the plates themselves, to ensure full contact of the active plate material with the fresh electrolyte.

The upper end of the case 2 is formed with an outwardly extending peripheral rib portion 6, the upper face of which is provided with a peripheral groove 7. Groove 7 is provided with a resilient, acid-resistant gasket element 8 which cooperates with a cover for the cell to give a tight fit.

Cover 9 of the case 2, like the body portion, is molded out of a suitable plastic. This cover extends over the upper end of the case and is provided with a depending peripheral rib 10 which fits the corresponding peripheral groove 7 of the case and tightly engages the gasket 8. A skirt portion 10 of cover 9 closely engages the inner surface of the case.

At its center the cover 9 is provided with a threaded opening 11 closed by a threaded filler plug 12. Adjacent each end and disposed in the longitudinal center line of the cover are integrally molded, depending sleeve portions 13 and 14. These contain resilient, acid-resistant bushings 15 and 16, respectively, through which extend the positive and negative terminals 17 and 18 of the plate assembly.

Terminals 17 and 18 preferably are provided with frusto-conical outer ends for engagement with terminal-connecting means to be later referred to in detail. Bushings 15 and 16 normally have an inside diameter slightly less than the body diameter of the terminals to assure a tight fit. The frusto-conical end portion of the terminals permit the terminals to be readily started into the bushings, these having first been pushed into place in the sleeves 13 and 14. We find that by pressing the terminals further on through the bushings there is had an engagement between the terminals and the bushing and between the bushings and the sleeves which is sufficiently tight to dispense with the need for any other securing means to mount the combined plate assembly securely on the cover. As shown in the drawings the frusto-conical ends of the cell terminals extend above the cover 9 for engagement by electrical connecting means hereinafter described.

The individual cells of an electric storage battery are assembled in a mounting frame and cover and electrically connected together to form a battery, as disclosed in Figs. 1, 2, 5 and 6. In the present example, three cells are shown so mounted and interconnected as for a 6-volt automobile battery. The mounting means of our battery comprises a frame including a base component 19 and a cover component 20, both preferably formed of acid resistant sheet metal such as stainless steel. The base component 19 is shown as formed from a sheet metal stamping comprising a rectangular bottom portion having the center portion thereof cut out to form side bottom and end bottom members 21 and 22 on which the cells rest. The end bottom members are provided with upturned flanges 23 and the side bottom members extend upwardly in vertical members 24. These latter terminate slightly above the covers 9 of the cells as inturned hook ends 25 which are adapted to engage the cover component as will be presently described.

Figure 1:
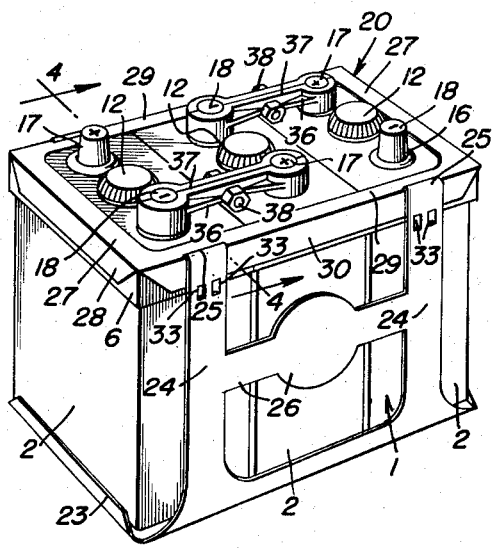
Fig. 1 is a perspective view of an electric storage battery embodying certain features of our invention.
Figure 2:
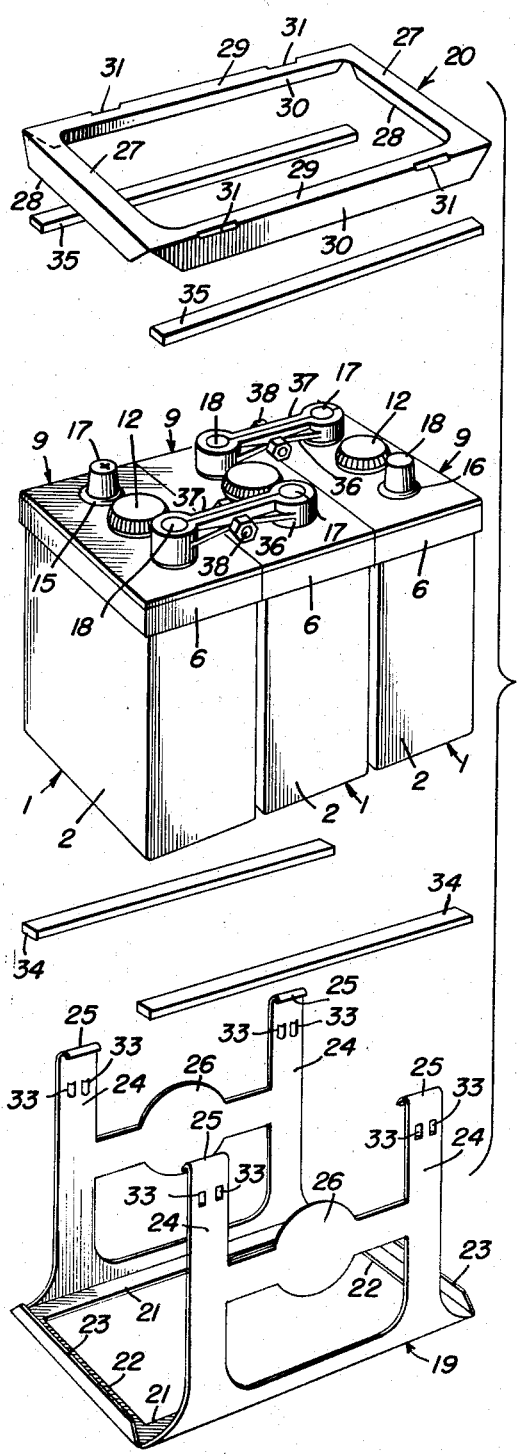
Fig. 2 is an exploded view of the battery of Fig. 1 in order to better illustrate certain features thereof.

The two members 24 rising from each of the side bottom members 21 preferably are so located along the lengths of the side bottom members as to come to about the centers of the end cells. This assures lateral support for the cells. Moreover, each pair of members 24 is preferably interconnected at about their mid length by an integrally formed cross member 26. This may be plain but preferably it is enlarged as, for example, in the form of a circular disc as shown in Figs. 1 and 2, to provide lateral support for the center cell of our three-cell battery.

The cover component 20 is formed from a sheet metal stamping and in plan is of hollow, rectangular configuration including end members 27 each having a depending flange 28 at the outer edge thereof and side members 29 each having a depending flange 30. The inner perimeter of the depending flanges is such that the cover freely fits over the group of three cells of the type above described and the inner perimeter of the members 27 and 29 overlies the cell covers while allowing ample clearance for the cells terminals.

At the angular bends in the side members 29 forming the flanges 30 are two spaced slots 31 for engagement by the cooperating hooks 25 provided on the two members 24. At the level of the lower edge of the flanges 30 there are inwardly struck on the members 24 the bosses 33, the purpose of which presently appears.

The frame component bottom side members each are provided with a strip of resilient material 34, preferably adhered thereto, on which the cells 1 rest. And the inner or lower face of the side members 29 of the cover component 20 are similarly provided with resilient strips 35 which rest on top of the ends of the cell covers 9.

In assembling our electric storage battery, the three cells are placed in the frame component in side by side relation. The cover component is then placed thereover with the side flanges of the cover component extending inside the members 24. By applying downward pressure on the cover component, with resultant compression of the resilient strips, and inward pressure on the side flanges of the same against the resiliency of the metal to permit the flanges to clear the cover component is pressed down sufficiently for the hooks 25 to enter the slots 31. Release of the pressure allows bosses 33, the compressed strips 34 and 35 to move the cover component upwardly into tight engagement with the respective hooks, the resilient strips still being under partial compression and thus holding the cells resiliently mounted and secured in the frame. At the time of this engagement bosses 33, which incident to application of the cover component were clear of the flanges of the cover component, as noted above, are brought beneath the lower edges of those flanges. Thus with the upward movement of the cover component under the influence of the compressed strips 34 and 35, the full engagement of hooks 25 in slots 31, there is had a locking of frame 19 and cover component 20 with firm gripping of cells 2 in proper position. Downward movement of the cover component again is precluded until cover flanges 30 are depressed sufficiently to ride off the bosses 33 and so permit the cover to be moved downwardly for release from the hooks 25. Thus accidental release of the cells within the frame structure is effectually precluded.

Our assembly is completed by interconnecting the cell terminals, other than the positive terminal of one end cell and the negative terminal of the other end cell. The intercell connectors of our battery illustrated comprise clamping means including reversely identical clamp elements 36 and 37 (see Fig. 5) and a clamping bolt and nut 38 which extends through aligned holes 39, 39 in these members. At one end each clamping member is provided with a substantially semi-circular socket 40 adapted to engage the side of the frusto-conical end of the positive terminal 17. At its opposite end each clamping member is similarly provided with a corresponding recess 41 adapted to similarly engage the side of the frusto-conical end of the negative terminal 18. The positive terminal is slightly larger than the negative terminal so that the clamping members can not be wrongly applied.

Between their ends the clamping members are provided with meeting faces which are normally slightly spaced apart and the members are formed of resilient metal having good conductive properties. When the bolt 38 is tightened (see Fig. 5) these faces are drawn toward each other and the resilience of the clamping members is thus utilized to maintain a tight clamping action on the terminals to preserve a good electrical contact therebetween. Additionally, to ensure proper assembly of the clamping members, one of the clamping members adjacent one end thereof may be provided with a boss 42 (see Fig. 6) engageable with a complementary socket 43 in the opposed face of the other member.

In the interest of continuity of description the assembly of the battery of our invention has been dealt with as it would proceed in the initial manufacture. It will be obvious, however, that after installation in use, any cell becoming defective can be quickly removed upon disconnecting the terminals and releasing the cover component of the frame. It then can be replaced by a new cell. Heretofore, when a cell has become defective, it has been necessary either to practically rebuild the battery in order to replace the cell elements or (as usually is the case) replace the entire battery.

The replaceability of cells is one of the many advantages achieved by our invention. Another advantage is the fact that the rib portions 6 of the cells holds the cells in spaced relation thus affording ventilation and consequent cooling of the battery when it is subjected to conditions of high rates of charge or discharge, both of which produce heat. Due to this novel construction, involving both thinner cell walls and air contact with the entire outer wall surface of each cell in the areas of generation of heat, higher rates of charge and discharge can be maintained without danger of overheating the battery. Furthermore, by making the cells of two plastic moldings and employing the simple mode of assembly of plate, separator and terminal unit into the cover economical manufacture of parts and the assembly thereof are had with important savings in manufacturing costs. Last, and very important, is the reduction in weight of the assembled battery, this deriving from the light weight of the lighter cells and the frame components as contrasted with the heavy, thick-walled battery cases which are in present general usage.

With these advantages in mind, it will be appreciated that while the foregoing disclosure relates to a presently preferred embodiment of our invention, it is not to be inferred that the invention is limited to the specific example of the invention so disclosed. It will be understood that the invention embraces all such changes and modifications and changes in the parts and in the construction, combination and arrangement of parts as shall come within the purview of the following claims.

We claim as our invention:

1. An electric storage battery comprising in combination, a plurality of individual cells; an open frame for resiliently but firmly housing the said cells in side-by-side group arrangement, said frame having a base component of sheet metal with spaced upstanding vertical side members terminating in hook portions, and an open sheet metal cover component having downwardly extending side flanges enclosing the top of said group of cells with spaced slots therein receiving the corresponding hook portions of said upstanding vertical members, the said upstanding vertical members being provided with bosses against which the side flanges of said cover component lock upon depressing the same; resilient means interposed between said group arrangement of cells and said open frame; and means electrically interconnecting said cells.

2. An electric storage battery comprising in combination, a plurality of individual cells, each having a case portion with upper slotted top edge, a cover portion therefor with skirt interfitting the slotted top edge thereof, and a sealing gasket at the base of the slot; an open frame for housing the said cells in side-by-side group arrangement, said frame having a base component of sheet metal for receiving said group with spaced upstanding vertical members and an open cover component embracing the top periphery of the group and having a slotted portion and a depressible edge portion, respectively cooperating with hook portions and inwardly extending bosses on said upstanding members to releasably lock the cells in position with firm but resilient contact; resilient strips interposed between the cover component of said frame and the top of said group of cells; and electrcial conductive means interconnecting said cells.

3. In an electric storage battery a frame for holding a plurality of cells in side-by-side group relation, said frame comprising in combination, a sheet metal base component for receiving said group of cells and having spaced upstanding vertical side members terminating in hook portions; and a cooperating open sheet metal cover component for embracing the top periphery of said group with flange portion and top portion with spaced slots therein for receiving the hook portion of said spaced upstanding vertical side members of the base component, said upstanding members being provided with inwardly extending bosses against which abut the edges of the flange portions of the cover component in locking arrangement; and a plurality of resilient strips engaging against the underside of said sheet metal cover component for contacting against said plurality of battery cells.

References Cited in the file of this patent

UNITED STATES PATENTS

| | | |
|---|---|---|
| 292,034 | Molera et al. | Jan. 15, 1884 |
| 764,282 | Duntley | July 5, 1904 |
| 1,218,056 | Cole | Mar. 6, 1917 |
| 1,296,961 | Irwin | Mar. 11, 1919 |
| 1,420,435 | Marko | June 20, 1922 |
| 1,486,434 | Holden | Mar. 11, 1924 |
| 1,491,880 | Percy | Apr. 29, 1924 |
| 1,542,821 | Bohannon | June 23, 1925 |
| 1,545,753 | Gilchrist | July 14, 1925 |
| 1,588,502 | Small | June 15, 1926 |
| 1,677,789 | Mabey | July 17, 1928 |
| 1,952,150 | Trimble et al. | Mar. 27, 1934 |
| 2,453,835 | Donkin | Nov. 16, 1948 |
| 2,621,222 | Wirth | Dec. 9, 1952 |
| 2,657,249 | Kurth | Oct. 27, 1953 |
| 2,717,273 | Anderson | Sept. 6, 1955 |
| 2,724,012 | Thompson | Nov. 15, 1955 |

FOREIGN PATENTS

| | | |
|---|---|---|
| 217,131 | Great Britain | June 12, 1924 |